United States Patent [19]

Tucker et al.

[11] 4,017,456

[45] Apr. 12, 1977

[54] COATING COMPOSITIONS COMPRISING STABILIZED REACTION PRODUCT OF HYDROXYL-TERMINATED URETHANE AND MELAMINE RESIN

[75] Inventors: Robert Jerome Tucker, Hackettstown; Ruth Greenwood, Somerville, both of N.J.

[73] Assignee: American Cyanamid Company, Stamford, Conn.

[22] Filed: Mar. 20, 1975

[21] Appl. No.: 560,417

[52] U.S. Cl. .................. 260/45.8 R; 260/45.9 R; 260/45.95 R; 260/850; 260/856; 427/421; 427/429; 427/430 R; 428/411; 428/412; 428/421; 428/425; 428/502; 428/522; 428/523; 428/524; 428/538

[51] Int. Cl.² .................. C08K 5/13; C08K 5/34; C08L 61/28

[58] Field of Search .......... 260/849, 45.95, 45.8 R, 260/856, 45.9 R

[56] References Cited

UNITED STATES PATENTS

| | | | |
|---|---|---|---|
| 3,384,606 | 5/1968 | Dieterich et al. | 260/849 |
| 3,542,718 | 11/1970 | Davis et al. | 260/849 |
| 3,626,023 | 12/1971 | Brizgys | 260/849 |
| 3,759,873 | 9/1973 | Hudak | 260/75 NK |
| 3,785,861 | 1/1974 | Tanimura et al. | 260/849 |
| 3,804,810 | 4/1974 | Fryd | 260/75 NK |
| 3,862,261 | 1/1975 | Stoddard | 260/849 |
| 3,899,611 | 8/1975 | Hall | 427/54 |
| 3,912,790 | 10/1975 | Chang et al. | 260/849 |
| 3,935,163 | 1/1976 | Spivack et al. | 260/45.75 N |

*Primary Examiner*—Murray Tillman
*Assistant Examiner*—Thurman K. Page
*Attorney, Agent, or Firm*—Frank M. Van Riet

[57] ABSTRACT

Compositions of matter consisting of (A) urethane prepolymers having terminal hydroxy groups produced from (1) a polyol of 200–3,000 molecular weight, (2) an organic polyisocyanate and (3) a polyhydric alcohol which are admixed with (B) a polyalkylether of a polymethylol and (C) an acid catalyst are rendered more adherent to polymeric substrates by incorporating therein various ultraviolet light absorbers.

6 Claims, No Drawings

COATING COMPOSITIONS COMPRISING STABILIZED REACTION PRODUCT OF HYDROXYL-TERMINATED URETHANE AND MELAMINE RESIN

BACKGROUND OF THE INVENTION

The use of polycarbonate resins for both home and industrial applications has increased tremendously in recent years. One of the most widely accepted applications of polycarbonates has been in the field of optical lenses, such as those used in the manufacture of eyeglasses, including safety glasses, and apparatus requiring lenses such as binoculars; microscopes and the like.

While the polycarbonates are excellent for these applications due to their excellent optical clarity and impact resistance among other features, they are disappointing in regard to their mar-resistance, as are many other polymeric substrates. The surfaces of lenses produced from these polycarbonates are therefore relatively easily scratched or otherwise marred, thereby rendering their lifetimes somewhat shorter than desired The tendency of these lenses to suffer surface damage has been most recently overcome by coating the lenses with mar-resistant coatings; see for example U.S. Pat. No. 3,518,040. In copending application, Ser. No. 560,415 filed of even date herewith, there is disclosed and claimed a novel coating composition useful in the improvement of the mar-resistance of polymeric substrates. These coatings provide excellent mar-resistance to polymeric substrates but usually tend to lose their adhesive quality after exposure to ultraviolet light.

SUMMARY

We have now found that the adhesiveness of the polyurethane coating composition of the above-mentioned copending application can be materially improved by incorporating therein various ultraviolet light absorbers. The resultant polymeric substrates which are coated with these novel coating compositions retain their excellent mar-resistance, clarity and impact resistance over an extended period of time.

Coatings derived from the reaction of alkylated melamine/formaldehyde materials and hydroxy-terminated urethane prepolymers are not new per se; see U.S. Pat. No. 3,542,718, but the products of the instant invention have exceptional light stability and adhesiveness when used to coat polymeric supports, a result which is totally unexpected.

DESCRIPTION OF THE INVENTION INCLUDING PREFERRED EMBODIMENTS

As mentioned briefly above, the crux of the instant invention resides in increasing the adhesion of a urethane prepolymer-based coating composition for polymeric substrates and, in particular, polycarbonates, which enables the resultant coated article to be used in such applications as glazing, safety lenses, display panels, furniture and the like, over greater lengths of time.

The use of a sterically bulky polyhydric alcohol as the urethane prepolymer end groups and the stepwise sequential preparation of the prepolymer result in a product having unique chemical properties when it is compounded with an alkylated melamine/formaldehyde material and an acid catalyst, applied as a coating to non-mar-resistant, polymeric articles of manufacture and cured. However, the coating seriously deteriorates upon weathering to the extent that it actually separates from the substrate.

In accordance with the present invention, one molar portion of a saturated diol having a molecular weight of from about 200 to about 3,000 is reacted with two molar portions of a saturated organic polyisocyanate to produce an isocyanate-terminated saturated urethane prepolymer which, in turn, is reacted at a molar ratio of about 1:2, respectively, with a monomeric, sterically bulky, polyhydric alcohol which contains 2-6 hydroxyl groups and which is free of oxyalkylene groups to produce a prepolymer having terminal hydroxy groups. The prepolymer, in turn, is then admixed with a polyalkylether of a polymethylol melamine and an acid catalyst. To this composite mixture is then added an ultraviolet light absorber to produce the novel composition of the instant invention. The resultant composition possesses a greater adhesive capacity when used as a cured coating on polymeric substrates than does the coating without the U.V. absorber.

The prepolymer having terminal hydroxy groups conforms to the general formula:

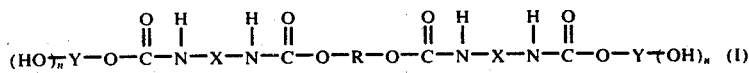

wherein
R is the reaction residue of a saturated diol having a molecular weight of 200 — 3,000,
X is the reaction residue of an organic diisocyanate,
Y is the reaction residue of a monomeric, sterically bulky, polyhydric alcohol of 4 – 18 carbon atoms containing no oxyalkylene groups, and $n$ is 1 to 5.

The saturated urethane prepolymer having terminal hydroxy groups described above is produced from diols such as the polyoxyalkylene adducts of diols and alkylene oxides such as ethylene oxide, propylene oxide, butylene oxide and mixtures thereof and the like. The diols useful in preparing these adducts include ethylene glycol, 1,2-propylene glycol, 1,3-propylene glycol, 1,2-butanediol, 1,4-butanediol, 1,6-hexanediol, hydroquinone, bisphenol A, and the like.

Typical polyoxyalkylene diols include polyethyleneether glycol, polypropyleneether glycol, polybutyleneether glycol, polytetramethyleneether glycol, block copolymers, e.g., combinations and polypropyleneether and polyethyleneether glycols; poly-1,2-oxybutylene and polyethyleneether glycols; and poly-1,4-oxybutylene and polyethyleneether glycols; and random copolyether glycols prepared from blends, or sequential addition, of two or more alkylene oxides.

Thus, the polyoxyalkylene diols which can be employed in this process are polyoxyalkylene polymers which have an oxygen/carbon atom ratio from about 1:2 and 1:4 and preferably, an oxygen/carbon atom ratio from about 1:2.8 to 1:4 and no more than 2 terminal hydroxyl groups. The polyoxyalkylene diols generally have an average equivalent weight from about 200 to 3,000 and preferably have an average equivalent weight from about 500 to 2,000. Also diol blends such as a mixture of high molecular weight polyoxyalkylene diols can be used in preparing urethane prepolymers having good properties.

Polyoxyalkylene arylene diols which also have molecular weights ranging from about 200 to about 3,000 but which differ from the above-described polyoxyalkylene diols in having arylene radicals, such as phenylene, naphthylene and anthrylene radicals, either unsubstituted or substituted, e.g., with alkyl or aryl groups, and the like, in place of some of the alkylene radicals of said polyoxyalkylene diols may also be employed. Polyoxyalkylenearylene glycols of the type ordinarily used for this purpose will usually contain at least one alkylene ether radical having a molecular weight of about 200 for each arylene radical present.

Essentially linear polyesters containing two isocyanate-reactive hydroxyl groups constitute another class of reactive organic diols which may be employed in preparing urethane prepolymers used in the present invention. While the preparation of polyesters suitable for this purpose has been described in great detail in the prior art and forms no part of the present invention per se, it may be mentioned here by way of illustration that polyesters of this type may be prepared by the condensation of a dihydric alcohol, generally a saturated aliphatic diol such as ethylene glycol, propanediol-1,2, propanediol-1,3, butanediol-1,3, butanediol-1,4 pentanediol 1,2, pentanediol-1,5, hexanediol-1,3, hexanediol-1,6, diethylene glycol, dipropylene glycol, triethylene glycol, tetraethylene glycol, and the like, as well as mixtures of such diols with each other, and the like, with a dicarboxylic acid, e-caprolactone, or anhydride which is either saturated or which contains only benzenoid unsaturation, such as oxalic, malonic, succinic, glutaric, adipic, pimelic, suberic, azelaic, terephthalic, sebacic, malic, phthalic, cyclohexanedicarboxylic and endomethylenetetrahydrophthalic acids, and the like, and their isomers, homologs, and other substituted derivatives, e.g., chloro derivatives. The linear polyesters used in preparing the urethane prepolymers also have molecular weights ranging from about 200 to about 3,000. In addition, they generally have relatively low acid numbers, e.g., acid numbers not appreciably in excess of about 60 and preferably as low as can be practicably obtained, e.g., 12 or less. Correspondingly, they have relatively high hydroxyl humbers, e.g., from about 30 to about 700. When preparing these polyesters, an excess of diol over dicarboxylic acid is generally used.

Nitrogen-containing diols may also be used as diol reactants. Among such materials there are included the polyesteramides conventionally employed in the preparation of urethane prepolymers, i.e., those having molecular weights ranging from about 200 to about 3,000, acid numbers ranging from about 60 as a maximum to as low as can be practicably obtained, e.g., 2 or less, and hydroxyl numbers ranging from about 30 to about 700.

As can be readily appreciated, mixtures of the various reactive organic diols described hereinabove may also be employed in preparing the urethane prepolymers of the present invention.

The organic diisocyanates which can be employed to produce the urethane prepolymer used in the present invention include, for example, the aliphatic, cycloaliphatic and aromatic diisocyanates including m-xylene diisocyanate, methylenediisocyanate, tetramethylene diisocyanate, hexamethylene diisocyanate, 4,4'-methylenebis(cyclohexyl isocyanate), 4-chloro-m-phenylene diisocyanate, isophorone diisocyamate, o, p, or m-phenylenediisocyanate, trimethylhexamethylene diisocyanate, 4-t-butyl-m-phenylenediisocyanate, 4,4'-methylene bis(phenyl isocyanate), tolylene diisocyanate, 1,5-naphthalene diisocyanate, 4-methoxy-m-phenylene diisocyanate, biphenylene diisocyanate, cumene-2,4-diisocyanate, 3,3'-dimethyl-4,4'-biphenylene diisocyanate, p,p'-diphenylene diisocyanate, 3,3'-dimethoxy-4,4'-biphenylene diisocyanate, mixtures thereof and the like.

The diol is completely reacted with the diisocyanate utilizing a molar ratio of about 1:2, respectively, in the presence of a suitable catalyst such as an organotin compound, e.g., dibutyltin dilaurate, dibutyltin octoate and the like; a tertiary amine, e.g., triethylene diamine; an organo lead compound, e.g., lead octoate and the like, at concentrations of from about 0.001% to about 0.1%, by weight, based on the total weight of the diol and diisocyanate. The reaction is allowed to proceed at a temperature of from about 60° C. to about 180° C. until the isocyanate terminated urethane prepolymer forms, i.e., from about 4 to about 24 hours.

The isocyanate-terminated urethane prepolymer is then reacted at a temperature ranging from about 60° C. to about 120° C. for from about ½ – 9 hours, with a monomeric, sterically bulky, polyhydric alcohol containing 2 – 6 hydroxyl groups but free of oxyalkylene units, in a molar ratio of 1:2 respectively. By "monomeric" is meant that these alcohols contain no repeating unit of themselves or other polymeric building blocks such as those exhibited by reaction adducts of glycols with ethylene or propylene oxide. By "sterically bulky" is meant that the steric dimension of the alcohol molecule is greater than simple ethylene or propylene glycol, i.e., it contains at least 4 but no more than 18 carbon atoms. Examples of alcohols which fit this description include 1,4-cyclohexane dimethanol, 1,4-butanediol, mannitol, trimethylol propane, trimethylol ethane, 1,1-cyclohexane dimethanol, hydrogenated bisphenol A, cyclohexane diol, neopentyl glycol, trimethylpentanediol, pentaerythritol, trimethylhexanediol and the like. The result of the second sequential step is the production of a urethane prepolymer having 2 – 10 terminal hydroxy groups, i.e., 1 – 5 groups at each end of the prepolymer.

The ultraviolet light absorbers which may be used to produce the novel compositions of the present invention may be added thereto in admixture with the urethane prepolymer, the alkylated melamine/formaldehyde material or individually after the prepolymer and melamine/formaldehyde material have been blended. Ultraviolet light compounds which may be employed include 2-[(2-hydroxy-5-t-octylphenyl)]benzotriazole, 2,2'-dihydroxy-4-methoxy-benzophenone and the like. The quantity of ultraviolet light absorber employed may range from about 1.0 to about 5.0% by weight, preferably from about 2.5 – 3.5%, by weight, based on the total weight of the solids in the final composition.

As set forth above, the urethane prepolymer having terminal hydroxy groups is then admixed with a polyalkyl ether of a polymethylolmelamine to form the coating composition. Examples of these melamine materials encompass the dimethyl, diethyl, dipropyl, dibutyl, etc. ethers, the trimethyl, triethyl, tripropyl, tributyl, etc. ethers, the tetramethyl, tetraethyl, tetrapropyl, tetrabutyl, etc. ethers, the pentamethyl, pentaethyl, pentapropyl, pentabutyl, etc. ethers, and the hexamethyl, hexaethyl, hexapropyl, hexabutyl, etc. ethers of the dimethylol, trimethylol, tetramethylol, pentamethylol or hexamethylol melamines. Of course, mixed polyalkyl ethers such as the dimethyl, tetraethyl ethers, etc. of the polymethylol melamines may also be used. The preferred melamine is hexakismethoxymethylmelamine. These materials may be produced as set forth in U.S. Pat. No.'s 2,906,724; 2,918,452; 2,998,410; 2,998,411; 3,107,227; 3,422,076, etc. which patents are hereby incorporated herein by reference.

The proportion of polyhydroxy urethane prepolymer to melamine compound should range from about 5:1 to about 1:1, respectively. The mixture of polyhydroxy urethane prepolymer and melamine compound is prepared at room temperature and ultimately cured, after having been coated on a suitable polymeric substrate, at a temperature of from about 50°–150° C. for 3–90 minutes.

From about 1.0% to about 10.0%, by weight, based on the weight of the polyhydroxyprepolymer and the melamine compound, of an acid catalyst is added to the polyhydroxy urethane prepolymer-melamine compound mixture before curing. Para-toluene sulfonic acid is preferred; however, xylene sulfonic acid, o- and m-toluene sulfonic acids, ethyl acid phosphate, n-butyl phosphoric acid, phosphoric acid, hydrochloric acid and the like can also be used.

While the use of a solvent is not essential in the sequential step production of the polyhydroxy urethane prepolymer or the addition of the melamine compound thereto, the use of a solvent is preferred both in the production of the prepolymer composition and in its use as coatings. Useful solvents should be sufficiently low boiling that they will vaporize from the composition when it is coated on the polymeric substrate but high enough boiling that they will not vaporize out of the reaction kettle when the composition is being prepared. Examples of suitable solvents include ethyl acetate, ethanol, methanol, cellosolve, butanol-cellosolve blends, xylene, toluene, butane, 2-ethoxyethyl acetate, methoxyethyl acetate, butoxybutyl acetate, amyl acetate, and other similar esters, ketones, chlorinated compounds, dioxane and the like. A practical range of solids in the solvent for coating purposes is between about 5% and 90% solids.

The resultant coating composition may be applied to the polymeric support by conventional means such as by brushing, spraying, dipping or coating with a doctor blade.

The polymeric materials which may be coated with the coating compositions discussed above include the polycarbonates, polyacrylates such as polymethyl methacrylate, polysulfones, phenoxy polymers, polyvinyl chloride, polyolefins such as polyethylene, polypropylene and the like. In general, any polymeric material whose surface requires mar-resistance improvement can be coated with the coating composition formed from the hydroxy terminated urethane prepolymer, the melamine compound and the acid catalyst.

The coatings should be applied to these polymeric materials at a thickness ranging from about 0.01 mil to 1.0 mil.

The following examples are set forth for purposes of illustration only and are not to be construed as limitations on the present invention except as set forth in the appended claims. All parts and percentages are by weight unless otherwise specified.

EXAMPLE 1

(Comparative)

To a suitable reaction vessel are added 1500.0 parts of polytetramethyleneether glycol having a molecular weight of about 2,000, 155.0 parts of polytetramethyleneether glycol having a molecular weight of about 620 and 760.0 parts of toluene. The vessel is blanketed with nitrogen and the mixture stirred until homogeneous. 520.0 parts of 1,4-methylenebis(cyclohexylisocyanate) and 20.0 parts of a 1% by weight solution of dibutyltin dilaurate in ethyl acetate are added. The reaction mixture is heated at 70° C. for 5 hours and 300.0 parts of 1,3-cyclohexanedimethanol (dried at 95° C. for 4 hours before use) are added thereto with stirring. Heating at 70° C. is continued for 1-¼ hours and 1565.0 parts of n-butanol are added and stirred until homogeneous. The resultant solution of hydroxy-terminated polyurethane prepolymer has a solids content of 51.4%, by weight.

To 480.0 parts of the prepolymer solution are added 240.0 parts of hexakismethoxymethylmelamine, 133.0 parts of the mono methyl ether of ethylene glycol, 450.0 parts of n-butanol, 14.4 parts of xylene, 10.36 parts of methanesulfonic acid and 1.0 part of a commercially available leveling agent.

The resultant coating formulation is coated onto polycarbonate eyeglass lenses by dipping the lenses into the formulation and curing them for 5 minutes at about 125° C. A hard, well-adhered, mar-resistant coating results.

The adhesion of the coating to the lenses is determined by cross-hatching the surface of each lens with a sharp knife to form a pattern of 1/16 inch squares. The pattern is covered with a piece of cellophane tape which is then rapidly pulled off. The coated adhesion is rated by the following scale:
Excellent: No coating is pulled off or loosened from the lens.
Very good: No coating is pulled off the lens but pattern corners may be loosened.
Good: Some small squares are removed.
Fair-Poor: Most of the coating pulls off.

The following results are obtained after exposing the above-coated lenses to carbon arc light in a Fadeometer.

| Hours Exposed | Adhesion |
|---|---|
| 0 | Excellent |
| 100 | Poor |

This comparative example illustrates that the coating composition of Example 1, which contains no ultraviolet light absorber, has poor adhesion to cast polycarbonate surfaces after exposure for 100 hours in a Fadeometer.

EXAMPLE 2

The procedure of Example 1 is followed except that 2.43 parts of 2-[2-hydroxy-5-t-octylphenyl)] benzotriazole are added to 133.0 parts of the final mixture produced therein. Lenses are coated and cured as described in Example 1. The following results are obtained after exposing the coated lenses to carbon arc light in a Fadeometer.

| Hours Exposure | Adhesion |
| --- | --- |
| 0 | Excellent |
| 100 | Excellent |
| 200 | Excellent |
| 300 | Very Good |
| 400 | Very Good |
| 500 | Fair – Good |
| 600 | Poor |

This example shows that the adhesion of the coating of Example 1 is greatly improved by adding thereto the above-specified benzotriazole.

EXAMPLE 3

The procedure of Example 1 is conducted except that 0.48 part of 2,2'-dihydroxy-4-methoxybenzophenone is added to 133.0 parts of the Example 1 mixture. The following results are obtained:

| Hours Exposure | Adhesion |
| --- | --- |
| 0 | Excellent |
| 100 | Very Good |
| 200 | Fair |
| 400 | Poor |

As can be seen, the use of the specified benzophenone also improves the adhesion of the Example 1 coating to the polycarbonate.

EXAMPLE 4

Under a nitrogen blanket, 93.0 parts of a polytetramethyleneether glycol having a molecular weight of about 620, and 100.0 parts of a polytetramethyleneether glycol having a molecular weight of about 2,000 are dissolved in 152.0 parts of toluene and to the solution are added 104.0 parts of 1,4-methylenebis(cyclohexylisocyanate) and 4.0 parts of a 1% solution of dibutyltin dilaurate in ethyl acetate. The resultant mixture is heated with stirring at 70° C for 5 hours and 60.0 parts of 1,4-cyclohexanedimethanol, previously dried by heating at 95° C. for 4 hours, are added with stirring. Heating is continued for 1-¼ hours and 152.0 parts of n-butanol are then added and stirred until the mixture is homogeneous.

To 480.0 parts of the resultant polyurethane prepolymer are added 240.0 parts of hexakismethoxymethyl melamine, 133.0 parts of methyl cellosolve, 450.0 parts of n-butanol, 145 parts of xylene, 0.5 part of leveler, 10.4 parts of methanesulfonic acid and 14.6 parts of 2-[(2-hydroxy-5-t-octylphenyl)]benzotriazole.

Polycarbonate lenses, coated with the resultant composition and dried at 100° C. for 15 minutes are classified as excellent after 300 hours in a carbon arc Fadeometer.

EXAMPLE 5

Using the procedure of Example 4, 49.5 parts of a polytetramethyleneether glycol having a molecular weight of about 660 and 50.5 parts of a polytetramethyleneether glycol having a molecular weight of about 2,000 are dissolved in 152.0 parts of ethyl acetate. 52.0 parts of the diisocyanate and 2.0 parts of the tin catalyst are added. When the reaction is complete, 30.0 parts of 1,4-cyclohexanedimethanol are reacted to produce the desired urethane prepolymer.

50.0 Parts of the prepolymer, 10.0 parts of hexakismethoxymethyl melamine, 20.0 parts of 95% ethanol, 20.0 parts of methanol, 1.0 part of methane sulfonic acid and 1.0 part of 2-[(2-hydroxy-5-t-octylphenyl)-]benzotriazole are then admixed and coated onto polycarbonate plano lenses as in Example 1. After 350 hours in a carbon arc Fadeometer, the adhesion remains excellent.

EXAMPLE 6

The procedure of Example 2 is followed except that the polytetramethyleneether glycol of 2,000 molecular weight is omitted. 73.5 Parts of the resultant hydroxy terminated urethane prepolymer, 26.5 parts of hexakismethoxymethyl melamine and 2.65 parts of p-toluene sulfonic acid are used to produce the coating composition. The composition is coated from a 24% solids mixture of ethyl acetate/hydroxyethyl ether/methanol/ethanol, 1.2/1.0/1.0/1.0. After 400 hours in the carbon arc Fadeometer, adhesion of the coating to the substrate is rated good.

EXAMPLE 7

The procedure of Example 2 is followed except that the 660 molecular weight polytetramethyleneether glycol is omitted. The adhesiveness of the resultant coating composition after 300 hours in the carbon arc Fadeometer is rated very good.

EXAMPLES 8 – 13

The procedure of Example 2 is followed except that the diol, diisocyanate, catalyst, sterically bulky polyhydric alcohol, curing catalyst and polymeric substrate are varied. The results are set forth in Table I, below. In each instance, the ultraviolet light absorber is 2-[(2-hydroxy-5-t-octylphenyl)]-benzotriazole except in Examples 10 and 12 wherein 2,2-dihydroxy-4-methoxybenzophenone is used as per Example 3. The adhesiveness results are after 200 hours in a carbon arc Fadeometer.

TABLE I

| EXAMPLE | DIOL | DIISOCYANATE | CATALYST | POLYHYDRIC ALCOHOL | CURING CATALYST | SUBSTRATE | ADHESIVENESS |
| --- | --- | --- | --- | --- | --- | --- | --- |
| 8 | Polyethyleneether Glycol-MW 238 | Tolylene Diisocyanate | Lead Octoate | 1,4-butanediol | Xylene Sulfonic Acid | Polyethylene | Excellent |
| 9 | Polycaprolactone Polyol-MW 540 | Hexamethylene Diisocyanate | " | Pentaerythritol | " | Polyvinyl Chloride | Very Good |
| 10 | Polypropyleneether Glycol-MW 1178 | 1,5-naphthalene Diisocyanate | " | 1,1-cyclohexane dimethanol | Ethyl Acid Phosphate | Polymethyl Methacrylate | Fair |
| 11 | Bisphenol A-Ethylene oxide adduct-MW 2800 | 4-methoxy-m-Phenylene Diisocyanate | Triethylene Diamine | Hydrogenated Bisphenol A | Hydrochloric Acid | Polypropylene | Excellent |
| 12 | Hydroxy Terminated Polyethylene Glycol Adipate-MW 1700 | p-Phenylene Diisocyanate | " | Trimethylol Propane | p-toluene Sulfonic Acid | Polycarbonate | Fair |

TABLE I-continued

| EXAMPLE | DIOL | DIISOCYANATE | CATALYST | POLYHYDRIC ALCOHOL | CURING CATALYST | SUBSTRATE | ADHESIVENESS |
| --- | --- | --- | --- | --- | --- | --- | --- |
| 13 | Hydroxy Terminated Polypropylene Glycol Terephthalate- MW 870 | Isophorone Diisocyanate | Dibutyl Tin Octoate | Mannitol | " | " | Excellent |

We claim:

1. A coating composition consisting essentially of a mixture of (1), (2), (3) and (4), in which
   1. is a saturated urethane prepolymer having terminal hydroxy groups which is the reaction product of materials consisting essentially of a mixture of (a) and (b), at a molar ratio of 1:2, respectively, in which
      a. is an isocyanate-terminated urethane which is the reaction product of a mixture of (I) and (II), at a molar ratio of 1:2, respectively, in which
         I. is a saturated diol having a molecular weight of from about 200 to about 3000 and
         II. is a saturated organic diisocyanate and
      b. is a monomeric, sterically bulky, polyhydric alcohol containing 2-6 hydroxyl groups and being free of oxyalkylene units,
   2. is a polyalkyl ether of a polymethylol melamine,
   3. is an acid catalyst and
   4. is an ultraviolet light absorber comprising 2-[(2-hydroxy-5-t-octylphenol)] benzotriazole or 2,2'-dihydroxy-4-methoxybenzophenone.

2. A composition according to claim 1 wherein said (I) is a polytetramethyleneether glycol.

3. A composition according to claim 1 wherein said (II) is methylene bis(cyclohexane isocyanate).

4. A composition according to claim 1 wherein said (b) is 1,4-cyclohexane dimethanol.

5. A composition according to claim 1 wherein said (2) is hexakismethoxymethyl melamine.

6. A process for the sequential production of the composition of claim 1 which consists of
   1. first reacting
      a. a one-molar proportion of a saturated diol having a molecular weight of from about 200 to about 3,000 with
      b. about a two-molar proportion of a saturated organic diisocyanate to produce an isocyanate-terminated urethane prepolymer,
   2. then reacting
      c. a one-molar proportion of said urethane prepolymer with
      d. about a two-molar proportion of a monomeric, sterically bulky, polyhydric alcohol containing 2–6 hydroxyl groups and being free of oxyalkylene groups, to produce a prepolymer having terminal hydroxy groups and
   3. admixing said prepolymer with
      e. a polyalkyl ether of a polymethylol melamine,
      f. an acid catalyst and
      g. an ultraviolet light absorber comprising 2-[(2-hydroxy-5-t-octylphenyl] benzotriazole or 2,2'-dihydroxy-4-methoxybenzophenone.

* * * * *